United States Patent [19]

Robinson

[11] 4,328,151

[45] May 4, 1982

[54] COATED CARBON FIBER REINFORCED POLY(VINYLIDENE FLUORIDE)

[75] Inventor: Donald N. Robinson, Collegeville, Pa.

[73] Assignee: Pennwalt Corporation, Philadelphia, Pa.

[21] Appl. No.: 250,827

[22] Filed: Apr. 3, 1981

[51] Int. Cl.³ .......................... C08K 3/04; C08K 7/06
[52] U.S. Cl. .................................. 523/205; 524/495; 524/545; 264/127; 264/331.14; 264/349; 428/378; 428/902
[58] Field of Search .................... 260/42.14, 42.27; 264/89.1, 29.2, 127, 349; 264/331.14

[56] References Cited

U.S. PATENT DOCUMENTS

| | | | |
|---|---|---|---|
| 3,318,850 | 5/1967 | Stilman | 260/78.5 |
| 3,367,812 | 2/1968 | Watts | 156/155 |
| 3,438,932 | 4/1969 | Sleron | 260/41 |
| 3,492,197 | 1/1970 | Olstowski et al. | 161/183 |
| 3,563,933 | 2/1971 | Stivers | 260/42.27 |
| 3,600,369 | 8/1971 | Toyoda et al. | 260/92.1 |
| 3,639,953 | 2/1972 | Kimura et al. | 23/209.1 |
| 3,682,595 | 8/1972 | Okuda et al. | 428/367 |
| 3,694,402 | 9/1972 | Essam | 260/40 R |
| 3,695,916 | 10/1972 | Pike | 117/47 R |
| 3,713,959 | 1/1973 | Rottmayer et al. | 161/59 |
| 3,837,904 | 9/1974 | Hill | 117/139.5 A |
| 3,852,429 | 12/1974 | Murayama et al. | 264/29.1 |
| 3,864,228 | 2/1975 | Rossetti | 260/42.27 |
| 3,885,174 | 12/1974 | Brie et al. | 260/40 R |
| 3,964,952 | 6/1976 | Brie et al. | 156/296 |
| 4,009,043 | 2/1977 | Preis | 106/204 |
| 4,009,305 | 2/1977 | Fujimaki et al. | 427/399 |
| 4,092,453 | 5/1978 | Jonda | 428/255 |
| 4,107,128 | 8/1978 | Hosoi et al. | 260/40 R |
| 4,120,998 | 2/1977 | Olez | 428/33 |
| 4,163,742 | 8/1979 | Mansure | 260/42.27 |
| 4,185,000 | 1/1980 | Gebauer et al. | 260/42.27 |
| 4,199,628 | 4/1980 | Caines | 428/36 |

FOREIGN PATENT DOCUMENTS 1324424  7/1973  United Kingdom .

OTHER PUBLICATIONS

Chem. Ptbst. vol. 78-137460e, (1973), Hotta et al., "Fluorine Resistant Fiber Composites", Japan 7301392, May 20, 1971.

*Primary Examiner*—Herbert J. Lilling

[57] ABSTRACT

Low shrinkage, mechanically strong, acid stable, carbon fiber reinforced poly(vinylidene fluoride) resin compositions are prepared by extrusion blending carbon fibers, which have been precoated with poly(vinylidene fluoride), with a poly(vinylidene fluoride) resin.

13 Claims, No Drawings

COATED CARBON FIBER REINFORCED POLY(VINYLIDENE FLUORIDE)

BACKGROUND OF THE INVENTION

One of the limitations of using poly(vinylidene fluoride), acronymn PVDF, resins as a material of construction in forming, for example, molded parts for pumps and valves, is the decrease in load bearing strength which occurs when the resins are heated to elevated temperatures. Another limitation of poly(vinylidene fluoride) is that it shrinks from 2 to 3% on cooling a hot molding of the resin. By incorporating carbon fibers into the resin, for example, as is described in British Pat. No. 1,324,424, its strength is improved and shrinkage on molding is reduced.

Compressed, expanded vermicular graphite, which has been coated with corrosion resistant resins including PVDF, has been disclosed as a coating material and laminate in U.S. Pat. Nos. 3,438,932 and 4,199,628. Articles formed from reinforced plastics, containing carbon or graphite fibers coated with epoxy polymers, are disclosed in U.S. Pat. No. 4,107,128. Other patents relating to carbon reinforced compositions include: U.S. Pat. No. 4,009,043 which discloses molding compositions of polymers, which can be halogen containing, along with both titanium and carbon fibers; and U.S. Pat. No. 3,885,174, in which carbon fibers coated with certain block or graft copolymers, including polyesters, epoxy, and polyimide resins are mixed with a compatible resin, i.e., one component of the graft copolymer. In the background section of U.S. Pat. No. 3,964,952, it is mentioned that, where carbon fibers are impregnated with a resin and then immersed in the same resin to form a composite, the composite has poor mechanical properties. In U.S. Pat. No. 3,682,595, a non-woven carbonaceous fabric is prepared by coating carbonaceous fibers with a resin such PVDF and then carbonizing the system.

Carbon fibers which have been coated with polyvinylpyrrolidone or an epoxy resin in order to improve their bulk density and handling characteristics, are commercially available. These coatings, however, are sensitive to hot acids and I have found that composites of PVDF and such fibers have significantly reduced tensile strength when they are immersed in hot hydrochloric acid, even though the PVDF matrix resin is acid resistant, because of wicking. This makes the composites unsuitable for making valves, pumps and other parts which will be exposed to acids. I have now prepared poly(vinylidene fluoride)-carbon fiber reinforced composites having increased tensile strength, lower mold shrinkage and increased stability to hot aqueous acids.

BRIEF SUMMARY OF THE INVENTION

In accordance with this invention, there is provided low shrinkage, strong, acid stable carbon fiber reinforced poly(vinylidene fluoride) compositions and articles molded therefrom comprising a poly(vinylidene fluoride) resin mixed with carbon fibers which have been precoated with poly(vinylidene fluoride). Also provided is a process for forming such carbon fiber reinforced compositions comprising melt blending poly(vinylidene fluoride) coated carbon fibers with a poly(vinylidene fluoride) resin in a manner such that the fibers are uniformly dispersed in the resin while attrition of the carbon fibers is minimized. This can be accomplished by extrusion blending.

DETAILED DESCRIPTION

The term "carbon fibers" as used herein is intended to encompass the various carbonaceous materials which have been used as reinforcing agents including carbon and graphite fibers and whiskers. I have found that the fiber length is important in providing enhanced reinforcement and the initial fiber length should be maintained throughout the mixing process. Fiber lengths of from about 3 to 15 mm can be used. Excellent results have been achieved using fibers of about 6 mm ($\frac{1}{4}$") in length. Carbon fibers which are about 0.4 mm in length have been found to provide negligible reinforcement. The fibers, in the form of a strand of yarn, are coated with a poly(vinylidene fluoride) resin. For ease of coating, because such resins in latex form are readily available, the fibers can be coated by dipping the yarn in a latex. The dipped yarn is passed through squeeze rolls to remove the bulk of the water, dried in a heated oven and then passed through an infra-red heater ring to fuse the resin to the fibers. The coated yarn is then cut into lengths to form coated fiber bundles which are suitable for use in the invention. The amount of resin coating should be at least about 3 percent by weight of the coated fibers with about 5–6 percent preferred. A minimum is needed to provide a good coating and formation of fiber bundles which will not fluff. Amounts greater than about 10% could be used, but no benefit would be expected.

Poly(vinylidene fluoride) resins suitable for the coatings are known in the art and are commercially available from Pennwalt Corp. under the trademark Kynar®.

The coated fibers are mixed with the poly(vinylidene fluoride) molding resin in amounts to provide a carbon fiber content of from about 5 to 20 percent by weight of the composite mixture. Amounts of less than about 5% do not provide significant reinforcement. At amounts of greater than 20%, the melt flow index of the composite becomes so low (below about 6 at 265° C.) that the material cannot be conveniently used in conventional molding processes. Amounts of around 10% by weight are preferred.

I have found that the process used to mix the coated fibers and the resins is important in obtaining reinforcement. Conventional high shearing mixing processes result in poor reinforcement due to attrition of the fibers. For example, Brabender melt-blending results in very little reinforcement. Accordingly, a mixing process must be used which minimizes the breakdown of the carbon fibers. Dry mixing followed by extrusion with controlled extruder screw speeds is suitable to retain a sufficient length for significant reinforcement.

Useful poly(vinylidene fluoride) resins are those having a molecular weight range suitable to produce molded articles. Such resins have melt viscosities of from about 10,000 to 30,000 poise. The particular resin is selected based on the application.

The invention is further illustrated by, but is not intended to be limited to, the following examples, wherein parts are parts by weight unless otherwise indicated.

EXAMPLE 1

Carbon fibers (unsized Celion C-6®, Celanese Corp.) are coated with poly(vinylidene fluoride) by immersing a strand of carbon fiber yarn in a poly(vinylidene fluoride) latex which has a solids content of about 36 percent by weight. The poly(vinylidene fluoride) has a molecular weight such that the melt viscosity of the polymer is about 20,000 poise. The dipped fibers are then passed through squeeze rolls to remove the bulk of the water and dried in a 260° F. oven. The polymer coating is then fused to the fibers by heating the fibers in an infrared heater ring and the coated fibers are chopped into ¼" length (6 mm) fibe bundles. The coated fibers contain 5–6% by weight of poly(vinylidene fluoride). Each bundle is about 3 mm in width.

EXAMPLES 2 & 3

Two batches of PVDF coated carbon fibers, which were made by the process described in Example 1, were used to prepare carbon reinforced poly(vinylidene fluoride) resin molding compositions. The compositions were tested for mold shrinkage, tensile strength, flexibility and acid stability. The chopped carbon fibers were mixed with a poly(vinylidene fluoride) resin powder (Kynar® 901 resin, Pennwalt Corp., which was prepared by suspension polymerization and which had a melt viscosity of about 20,000 poise), in a V-cone blender for 15–20 minutes at room temperature to form a premix containing about 10 percent by weight of the coated carbon fibers. The premix was extruded three times at a temperature of about 220°–230° C. using a single screw extruder to uniformly disperse the fibers in the resin. A twin screw extruder can be used to provide single pass mixing. The single screw extruder had a 1.25" diameter with a 24/1 length to diameter ratio. A slow screw speed of about 10 rpm was used to further minimize attrition of the carbon fiber length. The The extrudate was air cooled and pelletized. The coated carbon fiber poly(vinylidene fluoride) resin composite pellets were injection molded at 450° F. into tensile bars (6"×0.5"×0.125") which were used for testing. Instead of using resin powder in the premix, pelletized resin (Kynar® 900) can be used for easier feeding to the extruder.

The mold shrinkage was determined by ASTM D955 "Measuring Shrinkage from Mold Dimensions of Molded Plastics" in which the percent shrinkage is calculated by measuring the length of an injection-molded tensile bar (6"×0.05"×0.125") to the nearest 0.001", 24 hours after molding, compared to the original mold length. The tensile properties were determined by ASTM D638 "Tensile Properties of Plastics" in which the tensile strength and elongation of tensile bars are determined at a 0.2"/min crosshead speed. The Flexural Modulus was determined by ASTM D790 "Flexural Properties of Plastics" in which the flexural strength of the tensile bars is determined at a 0.05"/min crosshead speed. The test results are given in Table I below which also contains test results from Example 4 using polyvinylpyrrolidone (PVP) coated fibers, the values reported for uncoated carbon fiber containing PVDF in British Pat. No. 1,324,424 to Kureha, and test results for non-carbon fiber containing poly(vinylidene fluoride) resin.

EXAMPLE 4

The process of Examples 2 and 3 was repeated to prepare tensile bars except that the carbon fibers had a polyvinylpyrrolidone) coating (commercially available as Celion C-6 ® from Celanese Corp.). The test results on the bars are given in Table I below.

TABLE I

| Example | 2 | 3 | 4 | British 1,324,424 Kureha | Non-Reinforced |
|---|---|---|---|---|---|
| Composition | | | | | |
| Resin | 90% PVDF | 90% PVDF | 90% PVDF | 90% PVDF | 100% PVDF |
| Carbon Fibers | 10% | 10% | 10% | 10% | 0 |
| Fiber Coating | PVDF | PVDF | PVP | — | — |
| Fiber Length (mm) | 6 | 6 | 6 | 1–5 | — |
| ORIGINAL PROPERTIES | | | | | |
| Mold Shrinkage (%) | 0.11 | 0.15 | 0.25 | 1.0 | 2.26 |
| Flex. Modulus ($10^6$ psi) | 1.22 | 1.21 | 1.07 | 0.40 | 0.25 |
| Ambient $T_u$* (psi) | 12,160 | 14,420 | 11,500 | 9440 | 6635 |
| 100° C. $T_u$ | 7,980 | 7,800 | 5,990 | | 2975 |
| 140° C. $T_u$ | 4,680 | 4,640 | 3,310 | | 1570 |
| Ambient $E_B$** (%) | 7.0 | 8.7 | 8.0 | | >300 |
| 100° C. $E_B$ | 11.5 | 12.5 | 13.0 | | >300 |
| 140° C. $E_B$ | 32.0 | 37.0 | 55.0 | | >300 |
| ACID-EXPOSED PROPERTIES (10% HCl, 100° C., 1 week exposure) | | | | | |
| Flex. Modulus ($10^6$ psi) | 1.25 | 1.20 | 1.05 | | 0.27 |
| % Retention | 102 | 99 | 98 | | 108 |
| Ambient $T_u$ (psi) | 11,030 | 13,050 | 8610 | | 7000 |
| % Retention | 91 | 90 | 75 | | 106 |
| Ambient $E_B$ (%) | 6.6 | 7.8 | 6.7 | | 160 |
| % Retention | 94 | 90 | 84 | | 53 |

*Where $T_u$ is the ultimate tensile strength.
**Where $E_B$ is elongation at break.

From the results shown in Table I, the mold shrinkage using the PVDF coated carbon fibers was greatly reduced (less than 0.25 percent) compared to both the resin without any fibers added (2.26 percent) and using the uncoated fiber containing compositions of Kureha (1.0 percent) at the same carbon fiber content. A higher tensile strength, especially at elevated temperatures ($T_u$ above 4,500 psi at 140° C.) is possessed by the material of Examples 1 & 2. The superior tensile strength is retained to a greater extent (90 percent) than in the case with the polyvinylprroplidone coated fiber containing materials of Example 4 when the tensile bars were immersed in 10% HCl for a week. (The carbon fiber containing materials are less flexible than the pure resin as would be expected.)

When fibers coated with PVP as in Example 4 were mixed with PVDF using a Banbury mixer at either 50 rpm or 1–2 rpm at a temperature of 225° F., rather than an extrusion mixing at 225° C., the ambient tensile strengths were only 8600 psi and 9090 psi, respectively, which demonstrates that the mixing process is important and a high shear mixer, even at low speeds, caused the tensile strength to be lowered. This is believed to be due to severe attrition of the carbon fiber lengths. A similar result would be expected regardless of the fiber coating material.

Carbon fibers from other sources: Panex ® (Stockpole) and Fortafil ® (Great Lakes Carbon) which has fiber lengths of about 6 mm also gave an enhanced tensile strength composite at a 10% by weight level when used according to the invention, but one fiber, Thornel-VMD ® (Union Carbide) with a length of only about 0.4 mm, gave no benefit in tensile strength. This demonstrates the importance of fiber length on reinforcement.

I claim:

1. A low shrinkage, strong, acid stable, reinforced poly(vinylidene fluoride) composition comprising a poly(vinylidene fluoride) resin mixed with carbon fibers which have been precoated with poly(vinylidene fluoride) wherein the carbon fiber length is from about 3 to 15 mm, the carbon fibers are precoated with at least about 3 percent by weight of poly(vinylidene fluoride) and the precoated carbon fibers are present in an amount of from about 5 to 20 parts by weight of the composition.

2. The composition of claim 1 wherein the carbon fibers are coated with from about 3 to 10 percent by weight of the poly(vinylidene fluoride).

3. The composition of claim 2 wherein the coated carbon fibers are present in amount of from about 5 to 20 parts by weight of the composition.

4. The composition of claim 2 wherein the carbon fiber length is from about 3 to 15 mm.

5. The composition of claim 1 wherein the carbon fibers contain about 5 to 6 percent by weight of poly(vinylidene fluoride), the carbon fibers have an original length of at least about 6 mm and the carbon fibers are present in an amount of about 10 percent by weight of the composition.

6. A process of preparing a low shrinkage, strong, acid stable, reinforced poly(vinylidene fluoride) composition comprising melt blending poly(vinylidene fluoride) coated carbon fibers with a poly(vinylidene fluoride) resin by heating and mixing the resin and the coated carbon fibers with low shearing such that attrition of the length of the carbon fibers is minimized.

7. The process of claim 6 wherein the melt blending is by extrusion blending.

8. The process of claim 6 wherein the coated carbon fibers are present in an amount of from about 5 to 20 percent by weight of the composition.

9. The process of claim 6 wherein the carbon fiber length is from about 3 to 15 mm.

10. The process of claim 6 wherein the carbon fibers contain about 5 to 6 percent by weight of poly(vinylidene fluoride), and carbon fibers have a length of at least about 6 mm and the carbon fibers are present in an amount of about 10 percent by weight of the composition.

11. A low shrinkage, high tensile strength, acid stable shaped article of poly(vinylidene fluoride) resin having dispersed therein from about 5 to 20 percent by weight of carbon fibers having a length of from about 3 to 15 mm which fibers have been precoated with about 3 to 10 percent by weight of poly(vinylidene fluoride).

12. The article of claim 11 wherein the fibers have a length of at least about 6 mm.

13. The article of claim 11 wherein the mold shrinkage is less than about 0.25 percent, the tensile strength is above about 4,500 psi at 140° C. and the ambient tensile strength is at least about 90 percent retained after immersion for one week in 10% aqueous HCl at 100° C.

* * * * *